(12) United States Patent
Singh et al.

(10) Patent No.: US 10,133,683 B1
(45) Date of Patent: Nov. 20, 2018

(54) SEAMLESS INTERFACE FOR HARDWARE AND SOFTWARE DATA TRANSFER

(71) Applicant: Cadence Design Systems, Inc., San Jose, CA (US)

(72) Inventors: Pratul Kumar Singh, Greater Noida (IN); Kanwar Preet Singh Grewal, Noida (IN)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 261 days.

(21) Appl. No.: 15/279,259

(22) Filed: Sep. 28, 2016

(51) Int. Cl.
*G06F 13/10* (2006.01)
*G06F 13/16* (2006.01)
*G06F 5/06* (2006.01)

(52) U.S. Cl.
CPC ............ *G06F 13/105* (2013.01); *G06F 5/065* (2013.01); *G06F 13/1642* (2013.01); *G06F 2205/067* (2013.01)

(58) Field of Classification Search
None
See application file for complete search history.

(56) References Cited

U.S. PATENT DOCUMENTS

| | | | | |
|---|---|---|---|---|
| 4,744,084 A * | 5/1988 | Beck | ................... | G06F 17/5022 324/73.1 |
| 6,993,469 B1 * | 1/2006 | Bortfeld | .............. | G06F 17/5022 703/13 |
| 7,143,410 B1 * | 11/2006 | Coffman | ................. | G06F 9/526 718/100 |
| 8,880,802 B1 * | 11/2014 | Krishnamurthy | ... | G06F 12/0804 711/114 |
| 9,037,807 B2 * | 5/2015 | Vorbach | .............. | G06F 15/7867 711/147 |
| 2006/0061795 A1 * | 3/2006 | Walmsley | ............... | G06F 21/73 358/1.14 |
| 2007/0219771 A1 * | 9/2007 | Verheyen | .............. | G06F 11/261 703/15 |
| 2008/0221860 A1 * | 9/2008 | Jacobus | .................. | H04L 43/50 703/25 |

* cited by examiner

*Primary Examiner* — Michael Sun
(74) *Attorney, Agent, or Firm* — McDermott Will & Emery LLP

(57) ABSTRACT

An interface, a method, and a system are provided. In one or more aspects, the interface is for data transfer between simulation software and a hardware emulator associated with an integrated circuit design and includes a data producer to push a number of elements. A data element includes variable bits of data and variable bits of control information. A first-in-first-out (FIFO) receives the elements pushed by the data producer and stores pushed elements. A data consumer requests the pushed elements from the FIFO. The FIFO includes a buffer array, memory, a first push pointer and a first pop pointer associated with the buffer array, and a second push pointer and a second pop pointer associated with the memory. The buffer array stores elements in software and the memory stores elements in hardware. The interface facilitates moving a portion of hardware emulator functionalities into the simulation software and vice-versa at runtime by utilizing the FIFO.

20 Claims, 14 Drawing Sheets

U.S. 10,133,683 B1

SEAMLESS INTERFACE FOR HARDWARE AND SOFTWARE DATA TRANSFER

TECHNICAL FIELD

The present disclosure generally relates to electronic design automation (EDA), and more specifically relates to a seamless interface for data transfer between a hardware emulator and simulation software.

BACKGROUND

Verification intellectual property (IP) is one or more standards-compliant, plug and play modules that can be used to accelerate the development of a complete verification environment to cut down the time to a first test of an electronic design. A verification IP can consist of functional coverage blocks, bus functional models, traffic generators, and protocol monitors and can cut down overall verification time for engineers using different hardware verification language (HVL). Verification IP solutions enable verification engineers to focus on verifying their designs rather than spending an excessive amount of time setting up complex verification environments.

Oftentimes chips are too complex to verify with logic simulation software. A system-on-chip (SoC) including tens of millions of logic gates can overwhelm software simulators, even when running on the fastest servers. Simulating big designs requires hardware-assisted verification, an approach that uses special-purpose hardware to dramatically improve simulation performance. Just as simulation VIP simplifies traditional logic simulation, accelerated VIP makes hardware-assisted verification easier and more productive.

Accelerated VIPs (AVIPs) are used to funnel data to user's design-under-test (DUT) and respond to stimulus received from the DUT. Monitor functions such as collecting coverage and setting callbacks are not included. Tuned for performance, AVIPs are an integral part of a simulation acceleration environment, speeding up verification tens to thousands times relative to simulation. AVIP developers who develop their own transactors often face situations where moving part of the functionality implemented in hardware to software provides better verification capabilities. Conventional options include using direct programming interface (DPI) tasks and standard co-emulation modeling interface (SCE-MI) pipes to create new software and hardware modules to replace and/or augment an existing functionality. The SCE-MI interface can optimize performance and functionality when providing a transactional interface. The DPI tasks and SCE-MI interfaces, while performing well for their intended purposes, can be cumbersome to use and may require significant investment in terms of developer time.

SUMMARY

The disclosed system and methods provide for a seamless application programming interface (API) for hardware (HW) and software (SW) data transfer. The disclosed solution exploits the fact that most internal communications between independent HW blocks are performed by using some form of a first-in-first-out (FIFO) interface. The subject technology can be deployed in advanced verification scenarios with reduced developer effort on HW and SW side. For example, the disclosed solution can be used when a clean partition is identifiable between the modules that have to operate in HW and the modules that can be potentially moved to SW, for advanced verification scenarios, and be encapsulated inside the FIFO interface.

According to certain aspects of the present disclosure, an interface for data transfer between simulation software and a hardware emulator associated with an integrated circuit design is provided. The disclosed solution interfaces to an existing data producer and data consumer, to store a number of elements. A FIFO receives the elements pushed by the data producer and stores pushed elements. A data consumer requests the pushed elements from the FIFO. The FIFO includes a buffer array (e.g., in SW), memory (HW), a first push pointer and a first pop pointer associated with the buffer array (e.g., in SW), and a second push pointer and a second pop pointer associated with the memory (e.g., in HW). The buffer array stores elements in software and the memory stores elements in hardware. The interface facilitates moving a portion of hardware emulated functionalities into the simulation software by utilizing the FIFO to provide more verification capabilities and vice versa moving functionality to hardware from the simulation software for increased speed.

According to certain aspects of the present disclosure, a method of interfacing simulation software and a hardware emulator associated with an integrated circuit design is provided. The method includes providing a FIFO interface to facilitate moving a portion of hardware emulated functionalities into the simulation software by utilizing the FIFO to provide more verification capabilities and vice versa moving functionality to hardware from the simulation software for increased speed. The FIFO interface receives elements pushed by a data producer, stores pushed elements into a respective one of first or second memory, and increments a respective one of a first or a second push pointer. The FIFO interface further retrieves elements from the respective one of the first or second memory to a data consumer and increments a respective one of a first or a second pop pointer.

According to certain aspects of the present disclosure, a system for executing simulation software and a hardware emulator associated with an integrated circuit design is provided. The system includes a computing device, a number of servers in communication with the computing device, and an interface. The interface facilitates moving a portion of the hardware emulator functionalities into the simulation software by utilizing a FIFO interface and vice versa.

One or more of the computing device and the servers can execute one or more design simulation software or hardware emulation runs associated with an integrated circuit design. The FIFO interface can receive elements pushed by a data producer, store pushed elements into a respective one of first or second memory, and increment a respective one of a first or a second push pointer. The FIFO can further retrieve elements from the respective one of the first or second memory to a data consumer and increment a respective one of a first or a second pop pointer.

According to certain aspects of the present disclosure, a system for data transfer between simulation software and a hardware emulator associated with an integrated circuit design is provided. The system includes means for producing data (e.g., data producer) that can push a number of elements and means for storing and retrieving, such as a FIFO, to receive the elements pushed by the means for producing data and to store the pushed elements. The system further includes means for consuming data (e.g., data consumer) to request the pushed elements from the FIFO. The FIFO includes first means for storing (e.g., a buffer array), second means for storing (e.g., memory), first push pointer means, and first pop pointer means associated with the buffer array. The FIFO further includes second push pointer means and second pop pointer means associated with the memory. The buffer array stores elements in software and the memory stores elements in hardware. The system facilitates moving a portion of hardware emulator functionalities into the simulation software by utilizing the FIFO, while further allowing a seamless interface on both software and hardware ends to transmit and receive elements between software and hardware entities respectively.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

The disclosed system provides for a seamless application programming interface (API) for data transfer between hardware (HW) and software (SW), between two HW entities and between two SW entities. The subject technology can be deployed in advanced verification scenarios with reduced developer effort on hardware and software side. The disclosed solution may be based on adding simulation acceleration channels to a FIFO (also referred to as hybrid FIFO) that can then be used in a number of different modes including a HW-to-HW FIFO, SW-to-SW FIFO, a HW-to-SW FIFO, or a SW-to-HW FIFO.

The subject technology includes a number of advantageous features. For example, implementation of the disclosed solution allows greater flexibility during the development of the AVIPs itself and for enabling advanced verification scenarios. The hybrid FIFO instances of the subject technology, when compiled for a hardware emulator, consume less primary input/output (PIO) and gate area as opposed to existing SCE-MI pipe implementations for HW-to-SW and SW-to-HW data transmission. The disclosed technology can be faster than or as fast as the existing SCE-MI pipe implementation for HW-to-SW and SW-to-HW interactions. Software implementation of the SW-to-SW, SW-to-HW, and HW-to-SW modes can be thread-safe. A piece of code is thread-safe if it manipulates shared data structures in a manner that guarantees safe execution by multiple threads at the same time. The hardware and software implementation of the disclosed solution include a parameterized width control channel for data-type identification. The Hybrid FIFO itself can be used to serve as a data-rate adaptor between different hardware or software blocks, for example, for a one-byte input, four-byte output data transfer.

Example System Architecture

Figure 1:
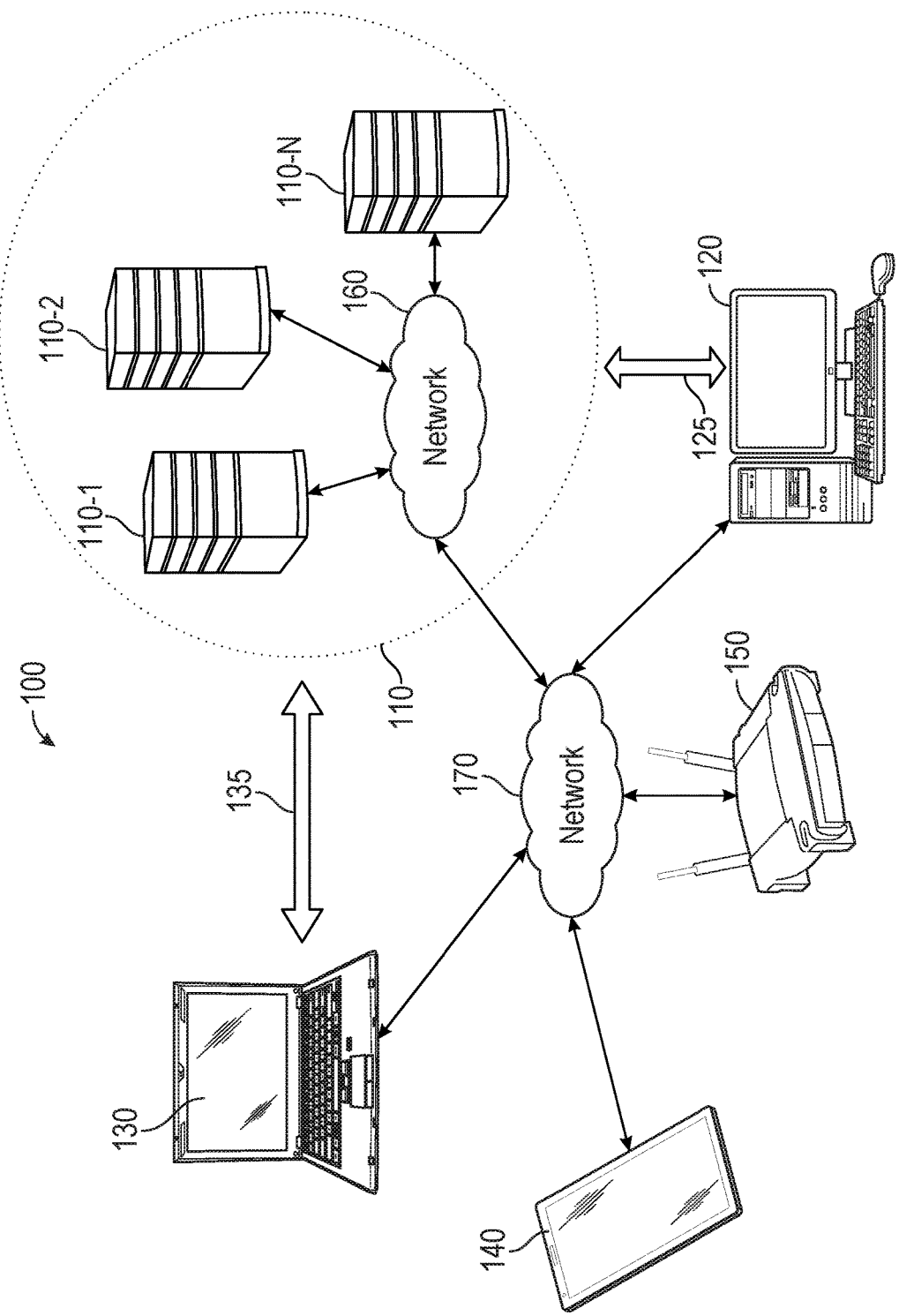
FIG. 1 illustrates an example environment in which the subject technology is used.

FIG. 1 illustrates an example environment in which the subject technology is used. The architecture 100 includes a server farm 110 including a number of servers (e.g., 110-1, 110-2 . . . 110-N) communicatively coupled through a network 160 and a computing device (e.g., a workstation) 120 coupled to one or more of the servers of the server farm 110 via a communication link 125. In some aspects of the disclosure, the architecture 100 includes a mobile computer 130, a mobile device (e.g., a smartphone or PDA) 140, and an access point 150 communicatively coupled via a network 170. In one or more aspects, one or more of the servers of the server farm 110 and the workstation 120 are also connected to the network 160 directly or via the network 170. The access point 150 may facilitate communication of various computers and devices with the network 170. Examples of the networks 160 and 170 include any one or more of a personal area network (PAN), a local area network (LAN), a campus area network (CAN), a metropolitan area network (MAN), a wide area network (WAN), a virtual private network (VPN), a broadband network (BBN), the Internet, and the like. Further, the networks 160 and 170 can include, but are not limited to, any one or more of the following network topologies, including a bus network, a star network, a ring network, a mesh network, a star-bus network, a tree or hierarchical network, and the like.

In some aspects, the mobile computer 130 is also capable of using a more robust and higher bandwidth communication link 135 similar to the communication link 125 for communicating with one or more servers of the server farm 110. In some aspects, the mobile computer 130 can have the capabilities of performing the functionalities of the workstation 120 and be actually used to perform those functionalities as disclosed herein. The servers 110 can be any device having an appropriate processor, memory, and communications capability for hosting simulation and emulation services, for example, simulation and emulation of analog and digital circuitry. The workstation 120 or the mobile computer 130 can support simulations and/or emulations by, for example, providing input samples for simulation and/or emulation runs performed by the servers of the server farm 110. In some aspects, one or more of the servers 110 can be a cloud computing server of an infra-structure-as-a-service (IaaS) and be able to support platform-as-a-service (PaaS) and software-as-a-service (SaaS).

In some aspects, the simulation and emulation runs can be hosted by the work station 120 and/or the mobile computer 130. In one or more aspects, the simulations are electronic design automation (EDA) software that can be used for simulation of various electronic circuit designs including analog and/or digital integrated circuit designs at the intellectual-property (IP) and block level. The hardware emulations are performed on hardware emulators that can be used for design verification at the system level and are capable of handling complex designs requiring more rigorous debugging. A hardware emulator can model a design under test (DUT) mapped onto the emulator, using hardware-description language (HDL) including Verilog HDL (VHDL) and register-transfer level (RTL).

In some aspects, the communication links 125 and 135 are high bandwidth and low latency communication channels (e.g., interfaces). The interfaces can optimize performance and functionality when providing a transactional interface, such as between the workstation 120 or the mobile computer 130 and one or more servers of the server farm 110. In one or more aspects, a user may access the workstation 120 or the mobile computer 130 via the mobile device 140, for example, to initiate transfer of one or more files or other transactions between the workstation 120 or the mobile computer 130 and the servers of the server farm 110.

In one or more aspects, the subject technology provides an application program interface (API) for seamless data transfer between the simulation software and the hardware emulator using a FIFO including a buffer, the content of which is completely accessible to the user, as described in more detail herein. The disclosed solution provides the option of implementing part of the functionality in software (e.g., simulation software) for hardware blocks, which either are not yet implemented or for which advanced verification capabilities available in software have to be used. This can allow deployment of advanced verification scenarios with reduced developer effort on hardware emulation side.

Figure 2:
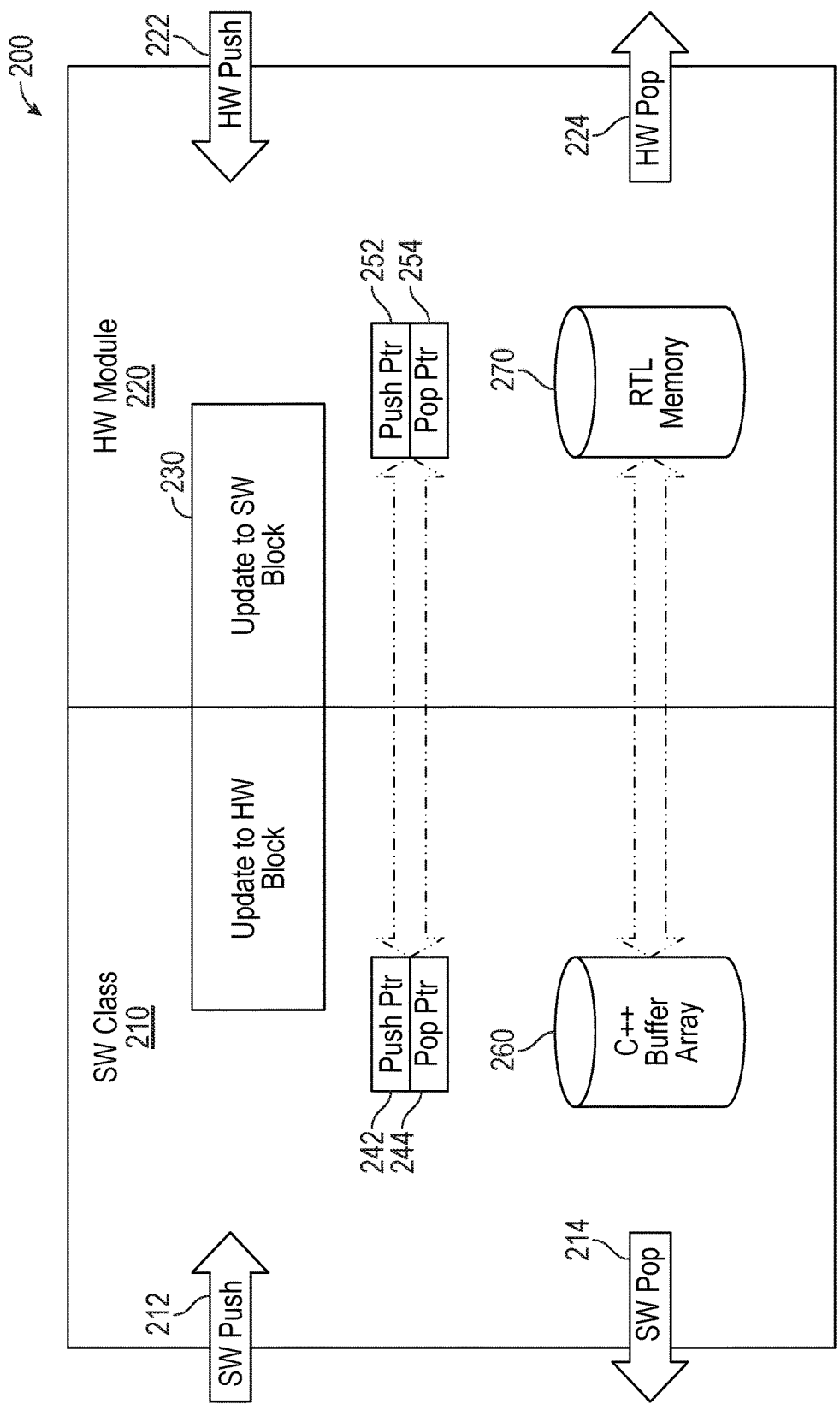
FIG. 2 is a block diagram illustrating an example architecture of an interface for data transfer between simulation software and a hardware emulator associated with an integrated circuit design according to certain aspects of the disclosure.
Figure 3A:
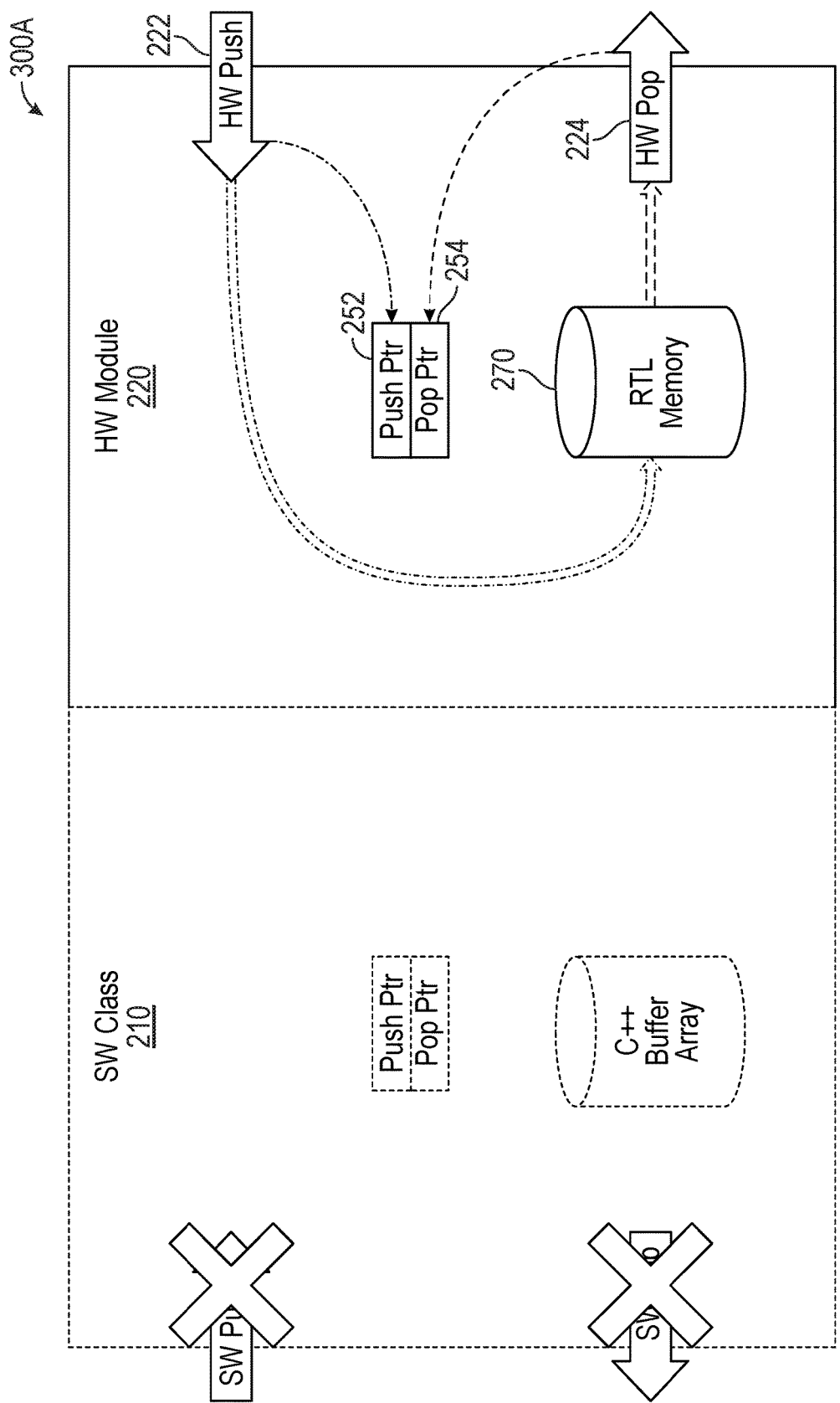
FIGS. 3A through 3D are diagrams illustrating example application instances of the interface of FIG. 2 according to certain aspects of the disclosure.
Figure 3B:
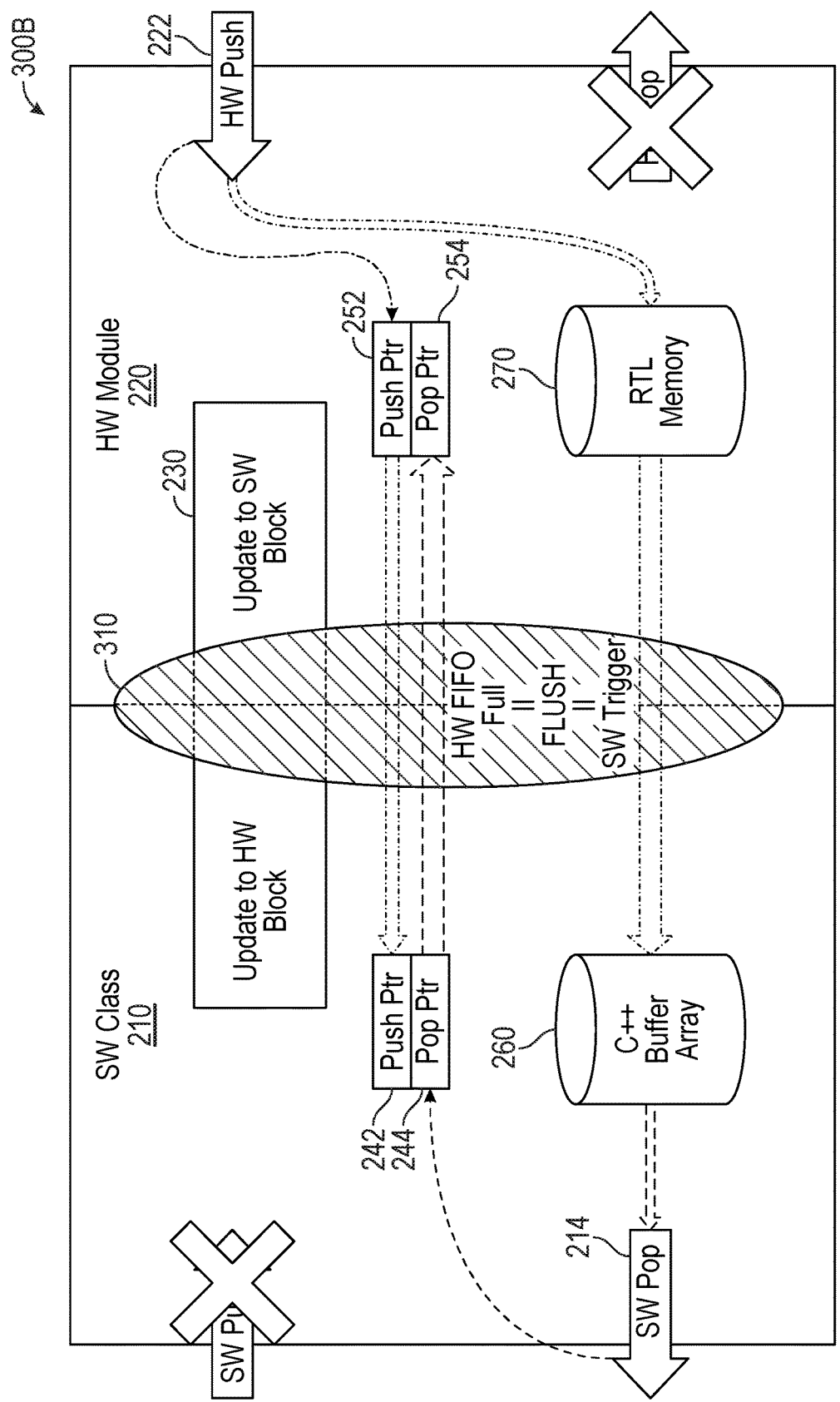
Figure 3C:
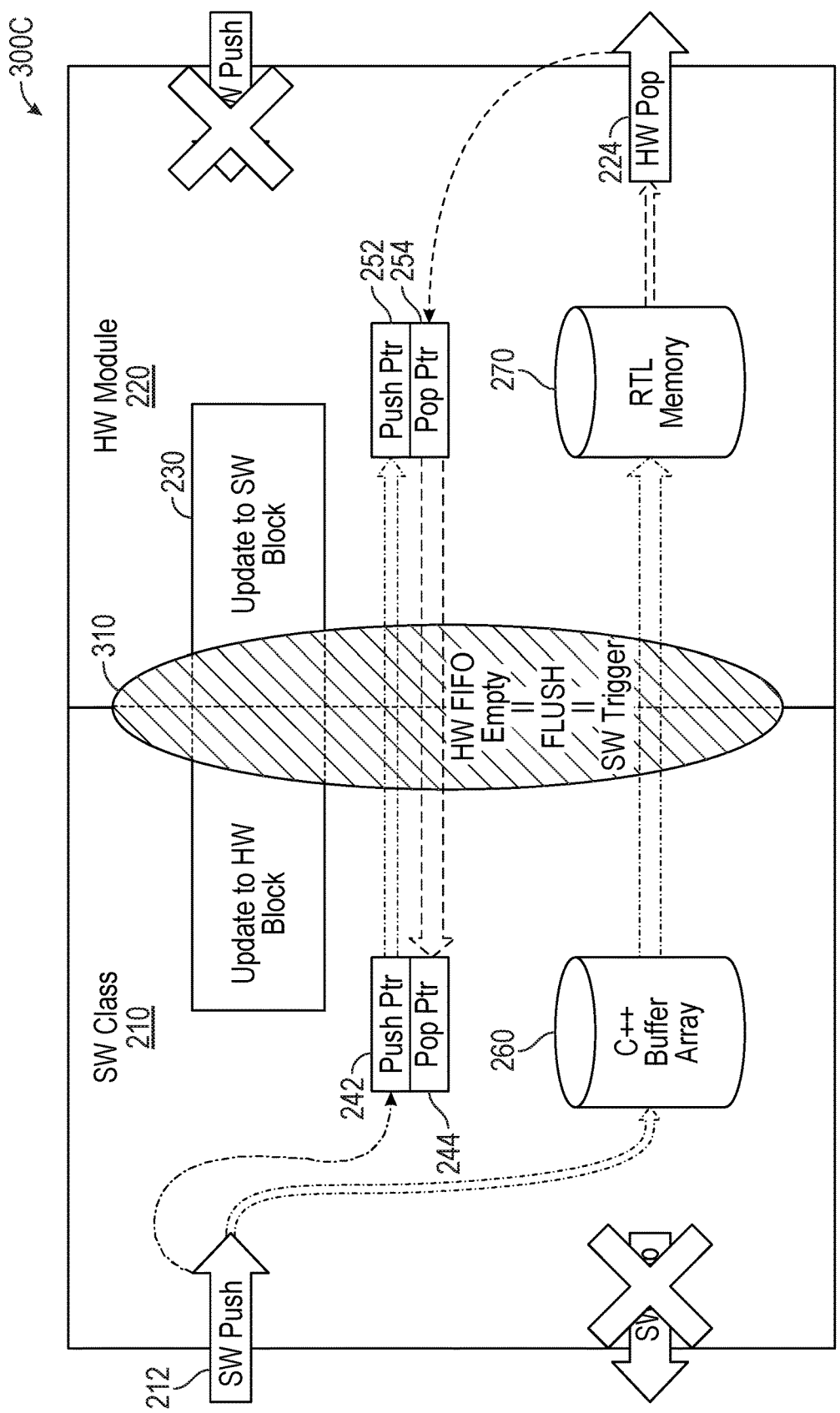
Figure 3D:
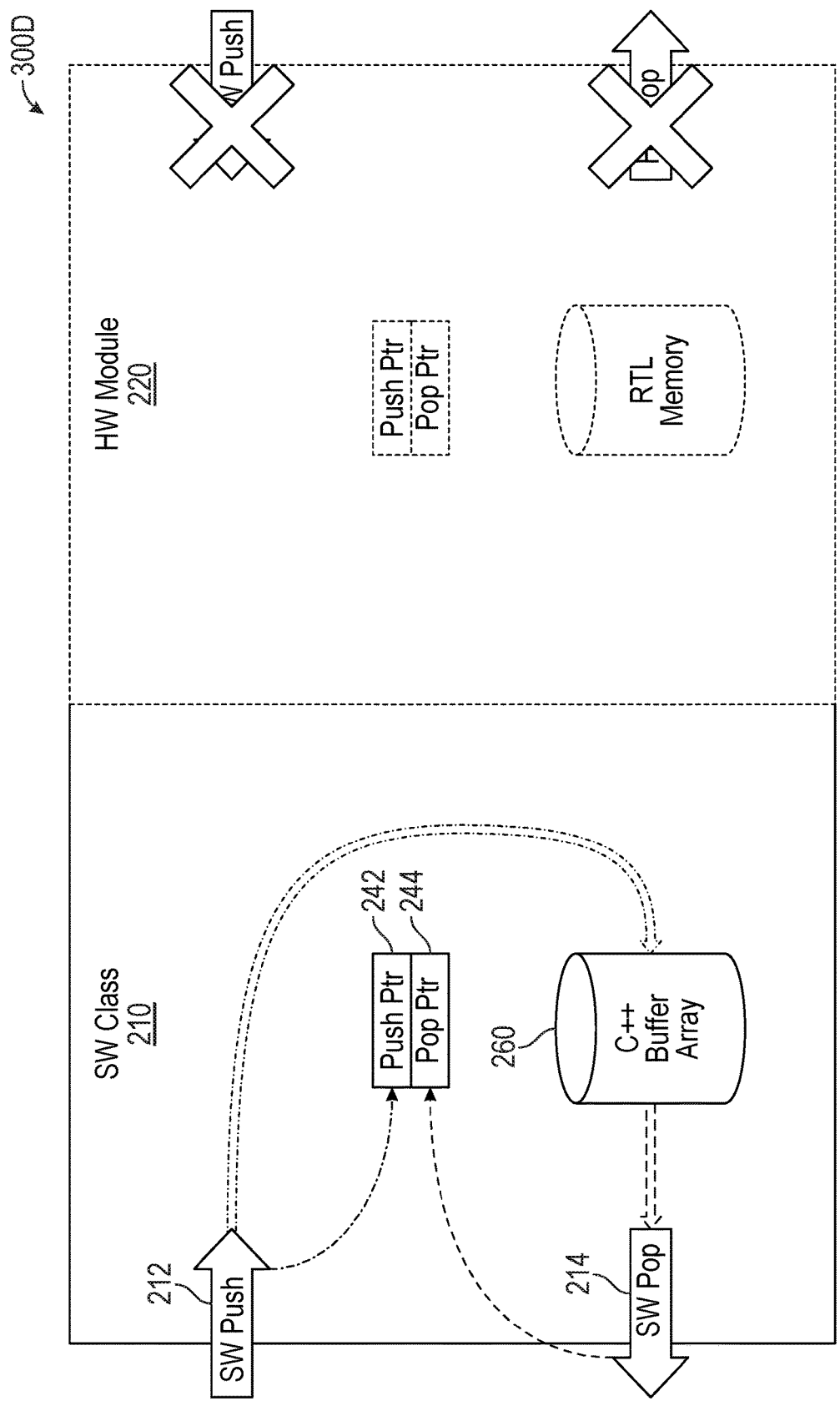

FIG. 2 is a block diagram illustrating an example architecture of an interface 200 for data transfer between simulation software and a hardware emulator associated with an integrated circuit design according to certain aspects of the disclosure. The interface 200 is a first-in-first-out (FIFO) interface such as a hybrid FIFO including a software portion (e.g., SW class) 210, a hardware portion (e.g., HW module or block) 220, and policy managers 230. The SW class 210 includes a buffer array 260 and push and pop pointers 242 and 244 associated with the buffer array 260 that are implemented in software. The buffer array 260 is a software buffer array such as a C++ buffer array capable of storing one or more elements each including a number of bits, for example, 16-bit wide, 8-bit wide, or 10-bit wide elements and a multi-bit control which contains metadata for the data. The push and pop pointers 242 and 244 are used to keep track of the data filled in the buffer array 260 and the empty space available. For example, the push pointer 242 includes the address in the buffer array 260 that the element (e.g., data and control information) is stored (e.g., pushed) in, and the pop pointer 244 includes the address in the buffer array 260 that the element (e.g., data and control information) is retrieved (e.g., popped) from.

The HW module 220 includes memory 270, a push pointer 252 and a pop pointer 254 associated with the memory 270 and is implemented in hardware (e.g., RTL). The memory 270 is a HW memory such as an RTL memory capable of storing one or more elements. In some aspects, the RTL memory 270 can be realized using a random access memory (RAM) or other types of memory. The push pointer 252 includes the address in the memory 270 that the element (e.g., data and control information) is stored (e.g., pushed) in, and the pop pointer 254 includes the address in the memory 270 that the element (e.g., data and control information) is retrieved (e.g., popped) from. In some implementations, the subject solution uses a one-byte pointer data type. In some aspects, the current data can be a result of a SW push operation 212 or a HW push operation 222. In one or more aspects, the retrieved current data can be consumed as a result of a SW pop operation 214 or a HW pop operation 224, as discussed in more detail herein. In some aspects, the SW push operation 212 and the HW push operation 222 are respectively performed by a software data producer and a hardware data producer, and the SW pop operation 214 and the HW pop operation 224 are respectively performed by a software data consumer and a hardware data consumer, as explained in more detail herein.

The policy managers 230 can provide policy updates to the SW class 210 and the HW module 220. The policy updates may pertain to transactions such as data transfer between the SW class 210 and the HW module 220. The policy updates, as explained below, may provide conditions under which such transactions can take place.

The operation of the interface 200 facilitates moving a portion of the hardware emulator functionalities into the simulation software by utilizing the FIFO. In some aspects, the hardware emulator functionalities may correspond to hardware blocks, which are not implemented yet or for which advanced verification capabilities are more readily available in software. The interface 200 allows moving the hardware emulator functionalities to software by enabling transactions between the data producer (e.g., HW or SW) and the data consumer (e.g., SW or HW). In such transactions, data elements can be transferred between software (e.g., SW producer or consumer) and hardware (e.g., HW consumer or producer).

FIGS. 3A through 3D are diagrams illustrating example application instances 300A through 300D of the interface 200 of FIG. 2 according to certain aspects of the disclosure. In the application instance 300A, the SW class 210 is not used and operation activities are taking place in the HW module 220. For example, a HW push operation 222 causes storing (e.g., pushing) one or more data elements from a hardware data producer in the RTL memory 270. After storing the data element(s), the push pointer 252 is incremented. In a HW pop operation 224, the stored data element(s) are retrieved (e.g., popped) from the RTL memory 270 and the pop pointer 254 is incremented.

In some implementations, the HW push operation 222 is the result of a push request, following which the push and pop pointers 252 and 254 are read to check if there is sufficient space in the memory 270 for the requested number of data elements (e.g., data elements and control elements). When the available space in memory 270 is sufficient, the data and control elements are written to the memory 270 and the push pointer is incremented. When there is less memory space than requested, the space available is filled up, and a respective number of elements that are stored is acknowledged. In some implementations, When a pop request is received, the push and pop pointers 252 and 254 are read to make sure enough data exist to support the request, and the data and control elements are then sent to the requestor, and the Acknowledgment for all the requested elements is sent back. Otherwise, the available elements are popped and acknowledged.

In one or more implementations, in the HW module 220, the subject technology uses two independent clock signals for push and pop operations 222 and 224, and the push and pop operations 222 and 224 can run in their own clock domains, making the end-user application simpler. This aspect of the subject technology can be used, for example, as a data rate convertor in hardware.

In the application instance 300B, both of the SW class 210 and the HW module 220 are active and data transfer is from hardware to software. When a request for a HW push operation 222 is received, the push and pop pointers 252 and 254 are checked to make sure there is enough memory for the requested number of data elements (e.g., data and control elements) before storing the pushed data elements in the memory 270. Once the pushed data elements are stored in the memory 270, the push pointer 252 is incremented. In some aspects, depending upon the policy chosen by the policy manager 230, the SW is intimated either on every push, or when the RTL memory 270 is full, or when a flush pin is asserted by the HW module 220, as indicated by the Boolean OR (||) operations, as shown in a policy notes 310. The SW instance of the memory can force synchronization at a desired time, which can pull nearly all data from HW and can synchronize the pointers as described above.

In some implementations, upon HW/SW synchronization, the content of the push pointer 252 is written to the push pointer 242 of the software side, and the content of the memory 270 is synchronized with the buffer array 260. After the synchronization, the memory 270 is cleared, and HW FIFO is empty. This is done to improve performance by doing transactions in batches. In case the SW requests for a forced synchronization, only some or nearly all content of the HW memory 270 are copied over to the SW buffer 260, and the contents of the pop pointer 244 of the software side are written to pop pointer 254 of hardware side. This is occurs in case the SW does not empty the entire memory content.

Upon receipt of a request for SW pop operation 214, the software retrieves data back from the buffer array 260, and increments the pop pointer 244. In case the SW side requests data to be read from the FIFO interface, a forced HW-SW synchronization can take place and all content of the RTL memory 270 are fetched to the software.

In the application instance 300C, both of the SW class 210 and the HW module 220 are active and data transfer is from software and hardware. The operation of application instance 300C is complimentary to the application instance 300B. When a request for a SW push operation 212 is received, the push and pop pointers 242 and 244 are checked to make sure there is enough memory for the requested number of elements (e.g., data and control elements) before storing the pushed elements in the buffer array 260. Once the pushed elements are stored in the buffer array 260, the push pointer 242 is incremented. In some aspects, depending upon the policy chosen by the policy manager 230, the HW is intimated either on every push, or when the buffer array 260 is full, or when a flush pin is set to true in a push method by the SW class 210, as indicated by the Boolean OR (||) operations 310, as shown in the policy notes 310.

In some implementations, upon HW/SW synchronization, the content of the push pointer 242 is written to the push pointer 252 of the hardware side, and the content of the buffer array 260 is synchronized with the memory 270. After the synchronization, the buffer array 260 is cleared. At a desired time the SW can force a synchronization, in which case the pop pointer is read back from the hardware.

Upon receipt of a request for HW pop operation 224, the hardware retrieves data back from the RTL memory 270 and increments the pop pointer 254. In case the HW side requests data to be read from the FIFO interface, a forced SW-HW synchronization can take place and the entire content of the buffer array 260 is fetched to the hardware.

In the application instance 300D, the SW class 210 is operational and the HW module 220 is not active. The operation activities are taking place in the SW class 210. The operation of application instance 300D is similar to the application instance 300A except that activities are in software.

In some implementations, a fixed sized array buffer is allocated, and push and pop pointers 242 and 244 are used to keep track of the data filled in the buffer array 260 and the available empty space there. This is distinct from a traditional SW FIFO, in which the amount of space available is not an issue. Also in the case of hybrid FIFO, elements pushed in the SW part have to be serialized and, when popped back, have to be de-serialized. Further, since the push and pop operation are completely delineated from each other, aside from updates of the push and pop pointers, the disclosed solution is thread safe for use with multi-threaded application. In some implementations, the subject technology further uses a mutex to guarantee that only a single thread can do push and pop operation at one time. The mutex is a program object created with a unique name that allows multiple program threads to share the same resource, (e.g., file access), but not simultaneously.

Figure 4A:
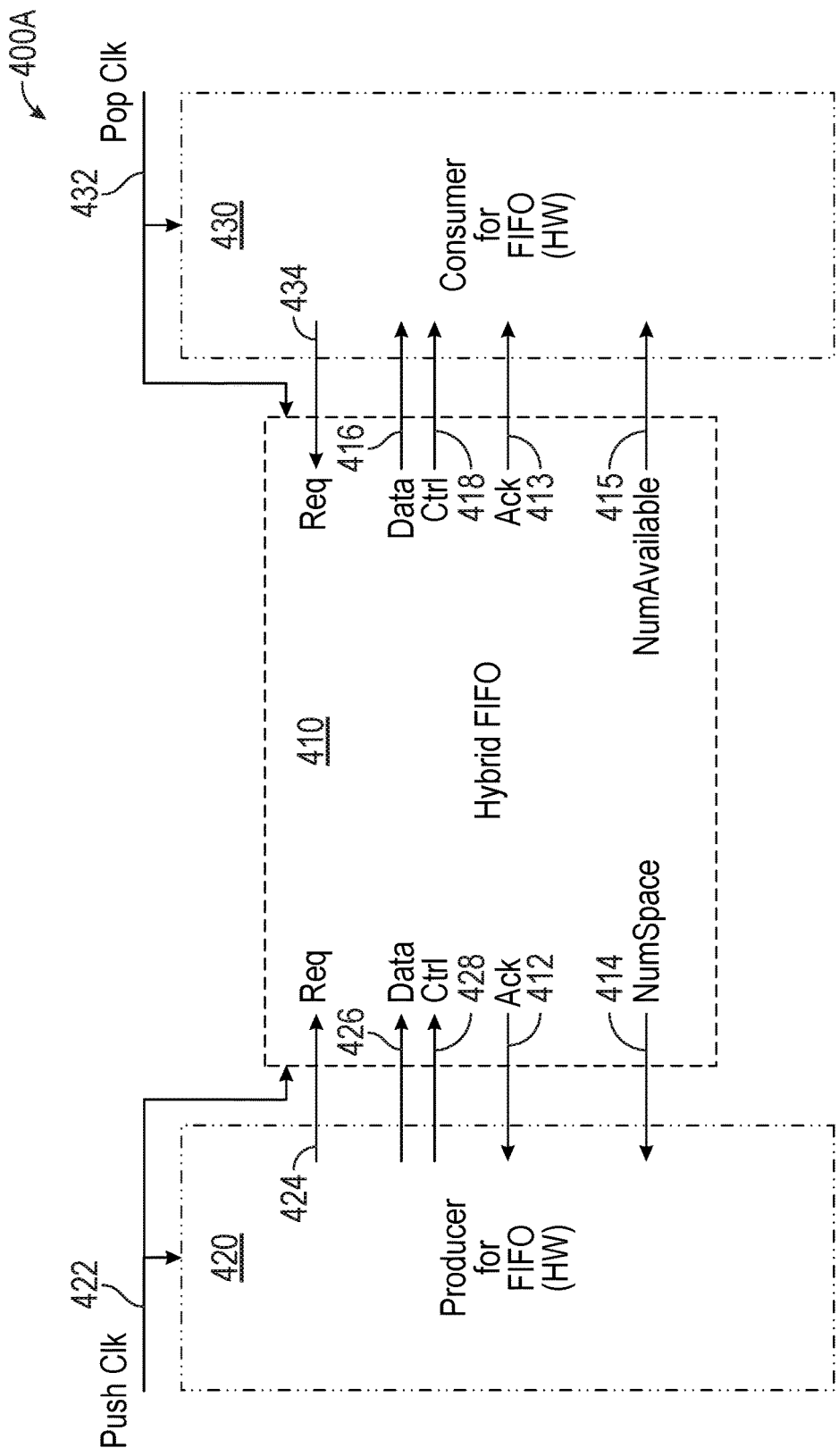
FIGS. 4A through 4D are diagrams illustrating example operation modes of the interface of FIG. 2 according to certain aspects of the disclosure.

FIGS. 4A through 4D are diagrams illustrating example operation modes 400A through 400D of the interface 200 of FIG. 2 according to certain aspects of the disclosure. The mode of operation shown in FIG. 4A is a HW-to-HW FIFO mode, where a data producer 420 and a data consumer 430 are design blocks residing in the hardware emulator (e.g., a server such as a server 110 of FIG. 1). In some implementations, the hybrid FIFO 410 is a Verilog RTL module created in the hardware emulator and interfaces two hardware modules. The hybrid FIFO 410 includes separate clocks 422 and 432 for push and pop operations.

The hybrid FIFO 410 periodically advertises a number of available spaces 414 to the data producer 420 and the number of available elements 415 to the data consumer 430. The push and pop requests 424 and 434 are received for a number N of elements from the data producer 420 and the data consumer 430, respectively. In some aspects, the elements can include data elements 426 and control data 428, which can act as qualifiers for the data elements 426. If the number of available spaces 414 or available elements 415 is more than or equal to N, the hybrid FIFO 410 acknowledges N elements via acknowledge (ACK) signal 412 and 413, respectively. Otherwise a number M (>N) of elements is pushed from the data producer 420 or popped to the data consumer 430 and M is acknowledged. The pop operation results in transferring data 416 and control 418 to the data consumer 430. In some aspects of the HW-to-HW FIFO mode, all non-RTL constructs can be compiled out to form a simple interface for two HW blocks capable of operating in an in-circuit emulation (ICE) mode.

Figure 4B:
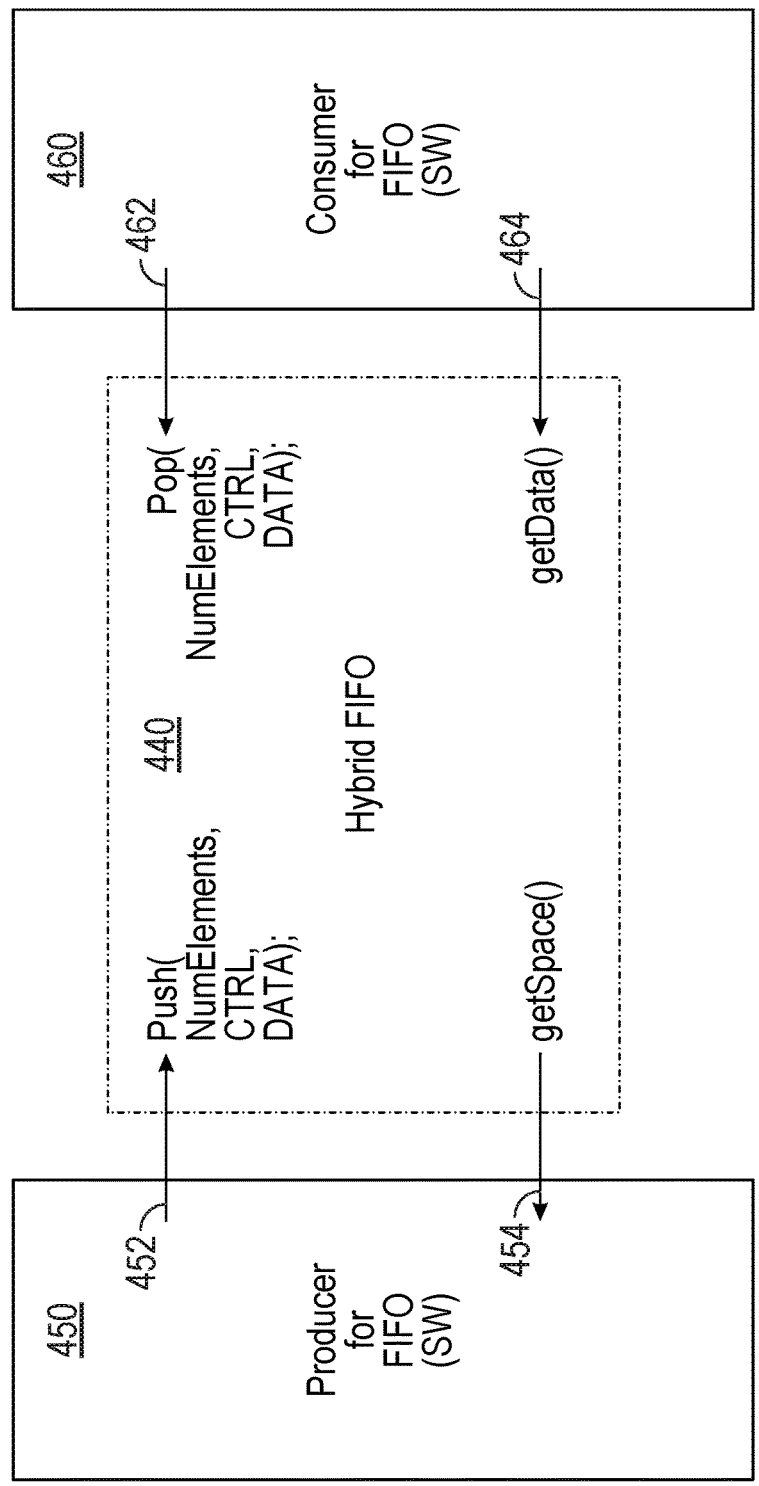

In the SW-to-SW mode of operation 400B shown in FIG. 4B, the hybrid FIFO 440 has a software entity (e.g., a C++ class) in the simulation software and a data producer 450 and a data consumer 460 are software entities such as software classes. The hybrid FIFO 440 returns the number of elements it can push or pop, in response to getSpace( ) method 454 and getData( ) method 464 issued by the data producer 450 and the data consumer 460, respectively. The push and pop requests 452 and 462 are received for a number N of elements from the data producer 450 and the data consumer 460, respectively. For example, the push and pop requests 452 and 462 are made by calling in push( ) and pop( ) methods in software, which provide the number of elements, control elements, and elements to be pushed or popped. The push( ) and pop( ) methods return the count of elements successfully pushed or popped.

Figure 4C:
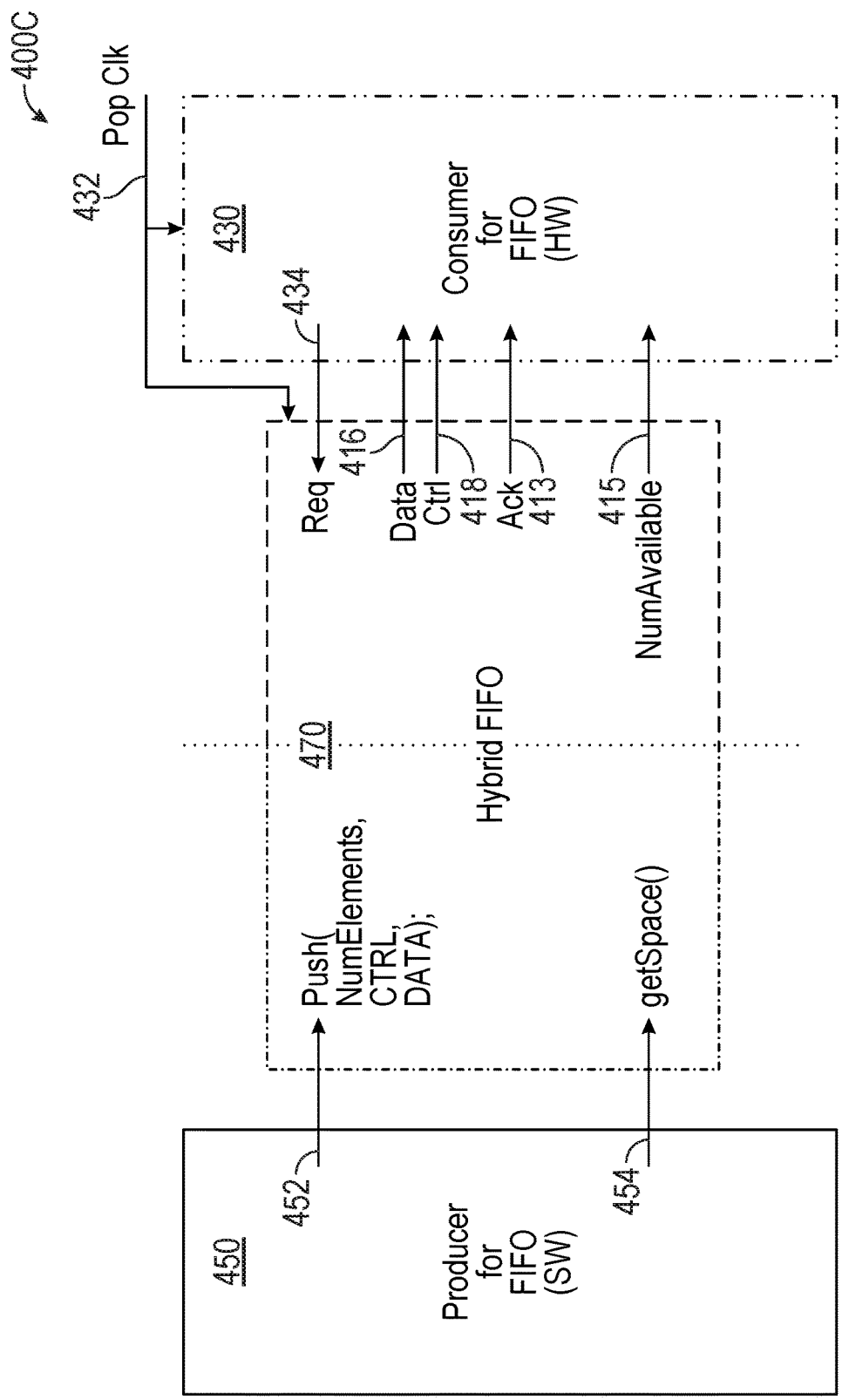

In the SW-to-HW mode of operation 400C shown in FIG. 4C, the hybrid FIFO 470 is an interface between the software data producer 450 and the hardware data consumer 430. On the software side, operations related to the push requests 452 and getSpace( ) 454 are as explained with respect to FIG. 4B. On the hardware side, the operations related to the pop request 434, the data 416, the control 418, the ACK 413, and the available elements 415 are as explained with respect to FIG. 4A. In the SW-to-HW FIFO mode of operation 400C, the software can perform the push operation to put data into the hybrid FIFO 470 and the hardware can pull the data out of the hybrid FIFO 470, thus operating in a mode similar to the SCE-MI input pipe.

Figure 4D:
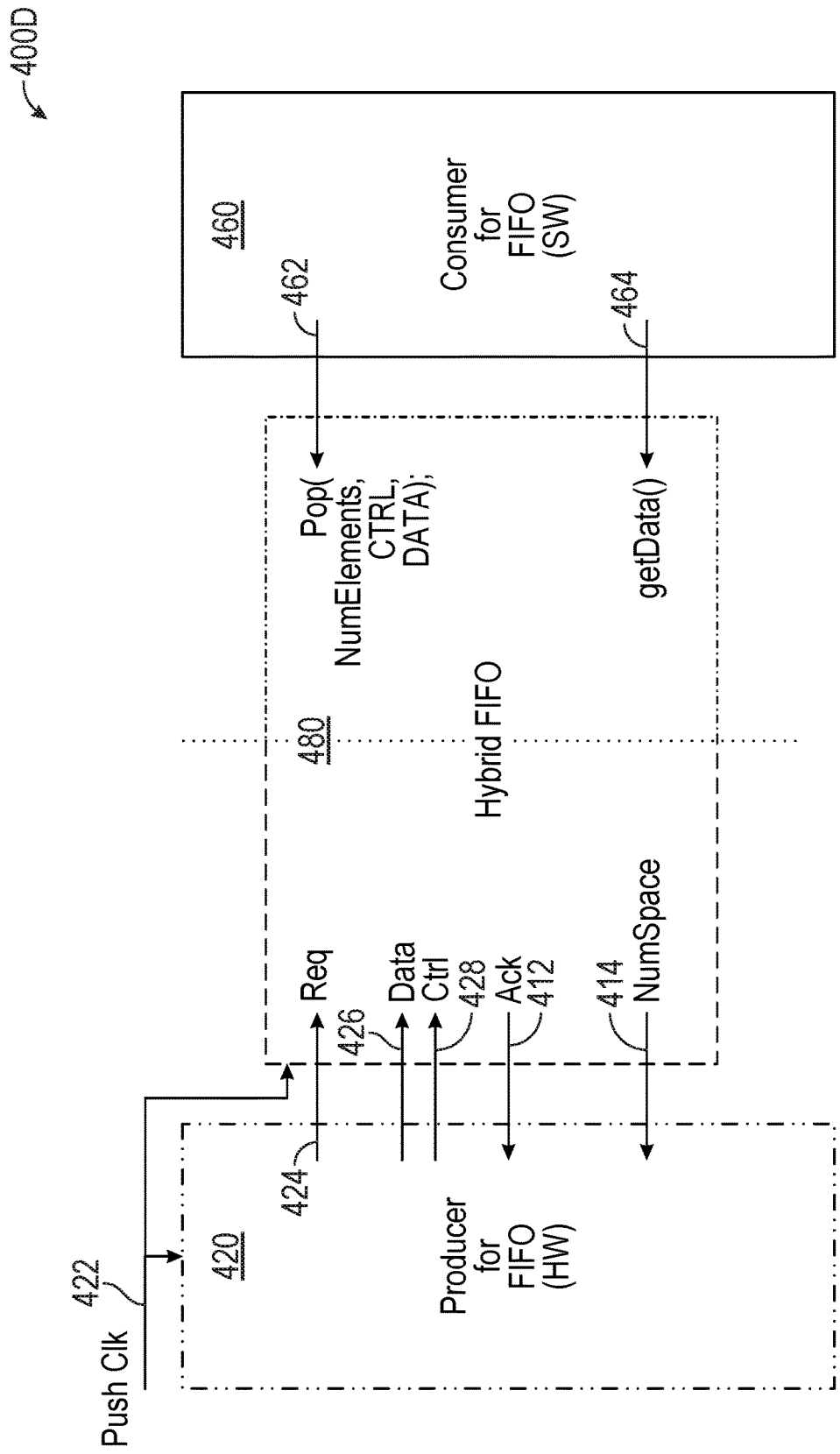

In the HW-to-SW mode of operation 400D shown in FIG. 4D, the hybrid FIFO 480 is an interface between the hardware data producer 420 and the software data consumer 460. On the hardware side, the operations related to of the pop request 424, the data 426, the control 428, the ACK 412, and the number of available space 414 are as explained with respect to FIG. 4A. On the software side, operations related to of the pop requests 462 and getData( ) 464 are as explained with respect to FIG. 4B. In the HW-to-SW FIFO mode of operation 400D, the hardware can perform the push operation to put data into the hybrid FIFO 480 and the software can pull the data out of the hybrid FIFO 480, thus operating in a mode similar to the SCE-MI output pipe.

Figure 5B:
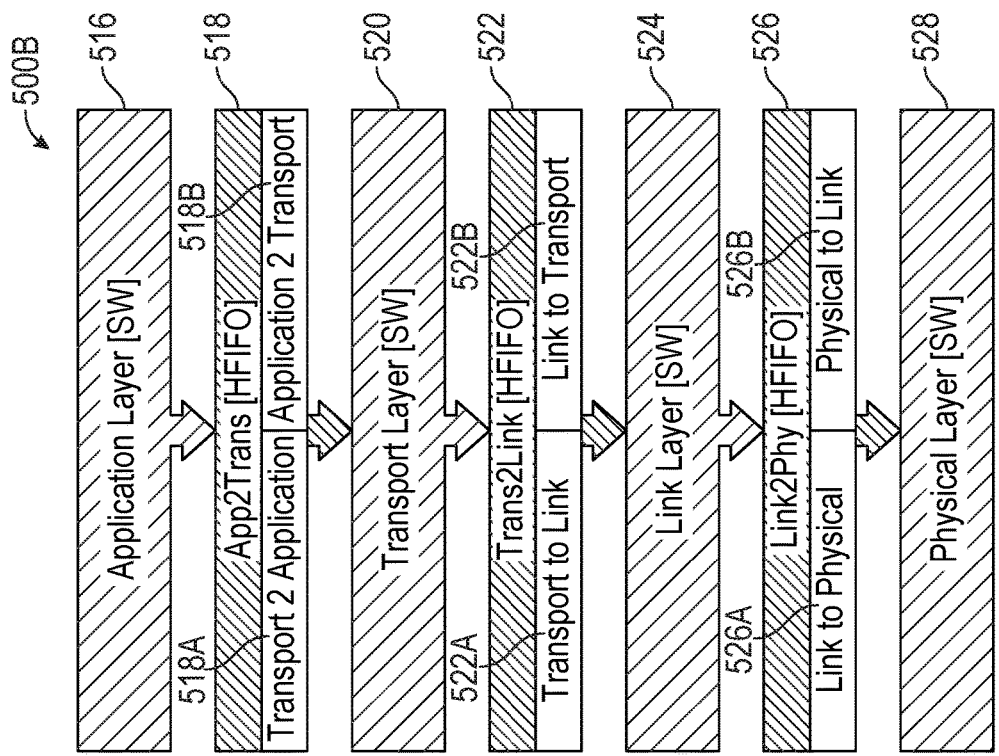
FIGS. 5A through 5C are diagrams illustrating example applications of the interface of FIG. 2 to verification intellectual property (VIP) and/or Accelerated VIP (AVIP) architectures according to certain aspects of the disclosure.
Figure 5A:
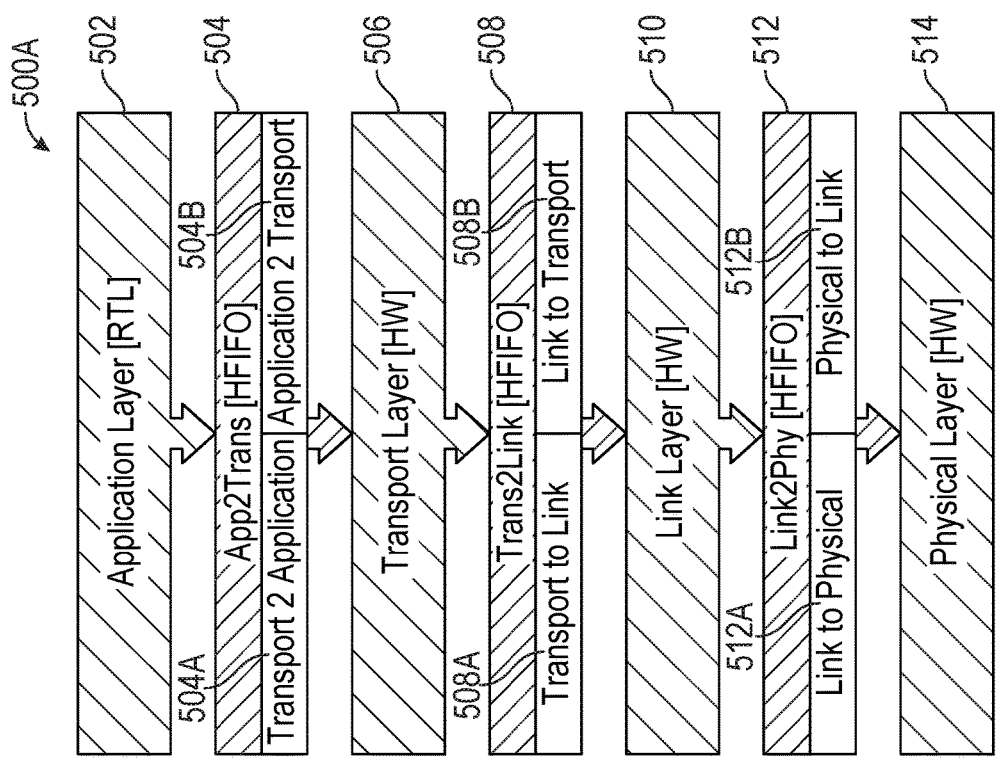
Figure 5C:
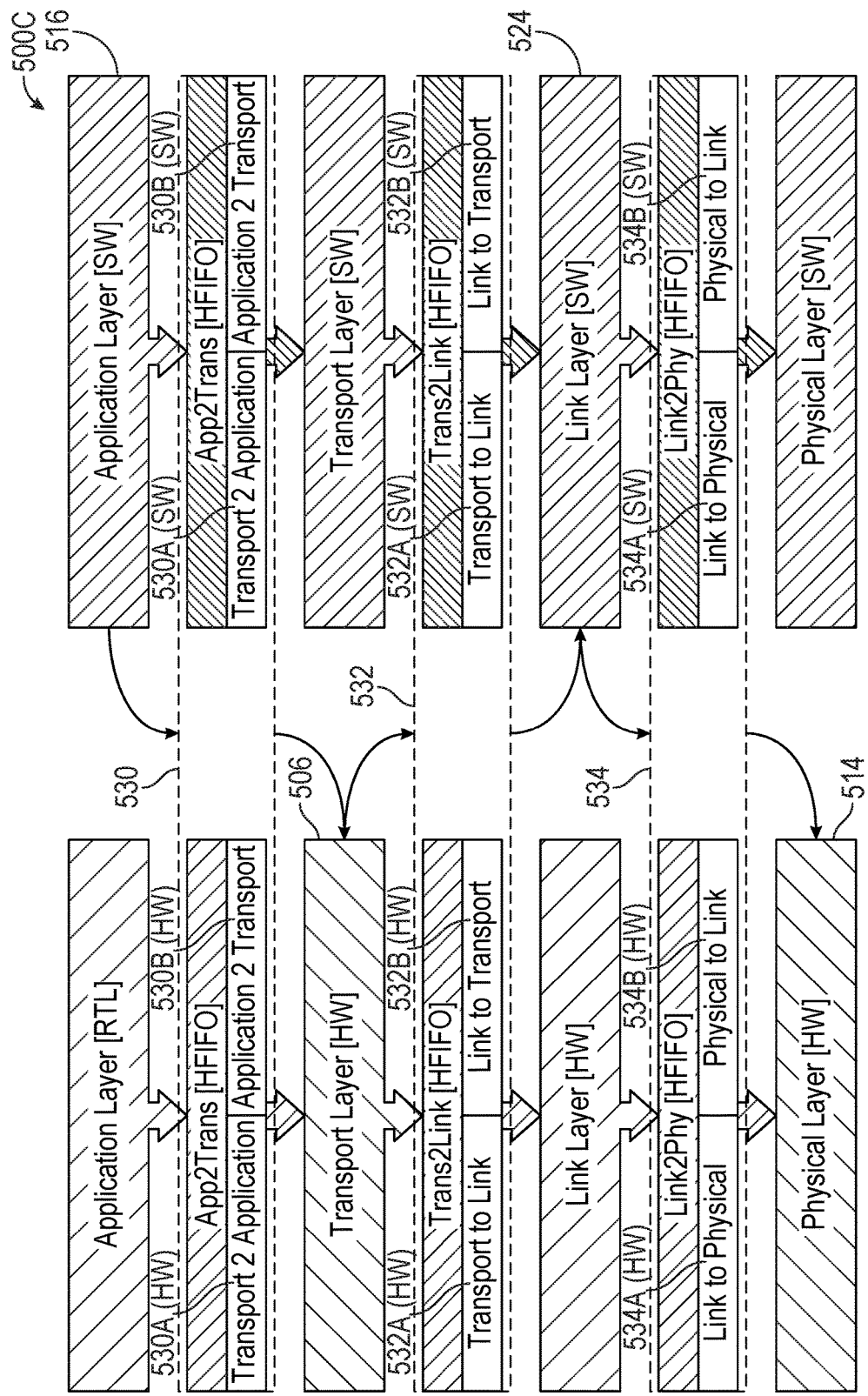

FIGS. 5A through 5C are diagrams illustrating example applications of the interface 200 of FIG. 2 to verification intellectual property (VIP) and/or Accelerated VIP (AVIP) architectures 500A through 500C according to certain aspects of the disclosure. The architecture 500A shown in FIG. 5A can be a hardware model running on the hardware emulator or software simulator and includes multiple protocol specific layers like application layer 502, transport layer 506, link layer 510, and physical layer 514, which are respectively interfaced with interfacing modules 504, 508 and 512 which contain multiple hybrid FIFO instances 504A, 504B, 508A, 508B, 512A, and 512B. The operation modes of the hybrid FIFO instances in the interface modules 504, 508, and 512 are similar to the hybrid FIFO 410 of FIG. 4A operating in HW to HW mode. These interface modules provide bi-directional communications between the respective hardware layers that they interface. For example, the interfacing module 504 supports application-to-transport and transport-to-application communications.

The architecture 500B shown in FIG. 5B is a software model running on the simulation software and includes multiple protocol specific layers like application layer 516, transport layer 520, link layer 524, and physical layer 528, which are respectively interfaced with interfacing modules 518, 522 and 526 which contain multiple hybrid FIFO instances 518A, 518B, 522A, 522B, 526A, and 526B. The operation modes of the hybrid FIFO instances within the interfacing modules 518, 522, and 526 are similar to the hybrid FIFO 440 of FIG. 4B, as described above. These interface modules provide bi-directional communications between the respective software layers that they interface. For example, the interfacing module 522 supports transport-to-link and link-to-transport communications.

In some implementations, the hybrid FIFO of the subject technology can be used in the next generation AVIPs and/or VIPs architectures for switching hardware layers to software for advanced verification or switching software layers to hardware in cases where operational speed is desired at runtime. This switch can happen on the basis of control registers within the hybrid FIFO. To enable this, the SW instances like 518A, 518B, 522A, 522B, 526A, and 526B are bound to their Hardware counterparts 504A, 504B, 508A, 508B, 512A, and 512B, respectively, using the HDL path that is the complete hierarchical path to the instance in the RTL.

For example, the architecture 500C shown in FIG. 5C is a hardware-software model running on both the simulation software and the hardware emulator and includes the application layer 516, the transport layer 506, the link layer 524, and the physical layer 514. The application layer 516 and the link layer 524 are in software, whereas the transport layer 506 and the physical layer 514 are in hardware. The hybrid FIFO interfacing modules 530, 532, and 534 are used to transmit elements from HW layers to SW layers and vice-versa. The hybrid FIFO interfacing module 530 contains Hybrid FIFO 530A that transmits data from transport layer in hardware to application layer in software, and is comprised of instance 530A(HW) and 530A(SW) and operates similar to the hybrid FIFO instance 400D of FIG. 4D. The other Hybrid FIFO instances 532A (comprising 532A (HW) and 532A (SW)) and 534B (comprising 534B (HW) and 534B (SW)) also operate in an identical manner, transmitting data from a Hardware entity (Transport (506) and Physical (514) Layers respectively) to a Software entity (Application Layer (516) and Link Layer (524)). Conversely the Hybrid FIFO instances 530B (containing 530B(SW) and 530B(HW)), 532B (containing 532B(SW) and 532B(HW)) and 534A (containing 534A(SW) and 534A(HW)) transmit data from one of the SW entities (the application layer 516, and the link layer 524 respectively) to one of the layers present in hardware (e.g., the transport layer 506 and the physical layer 514, respectively) operating in a mode similar to the hybrid FIFO instance 400C of FIG. 4C.

Figure 6:
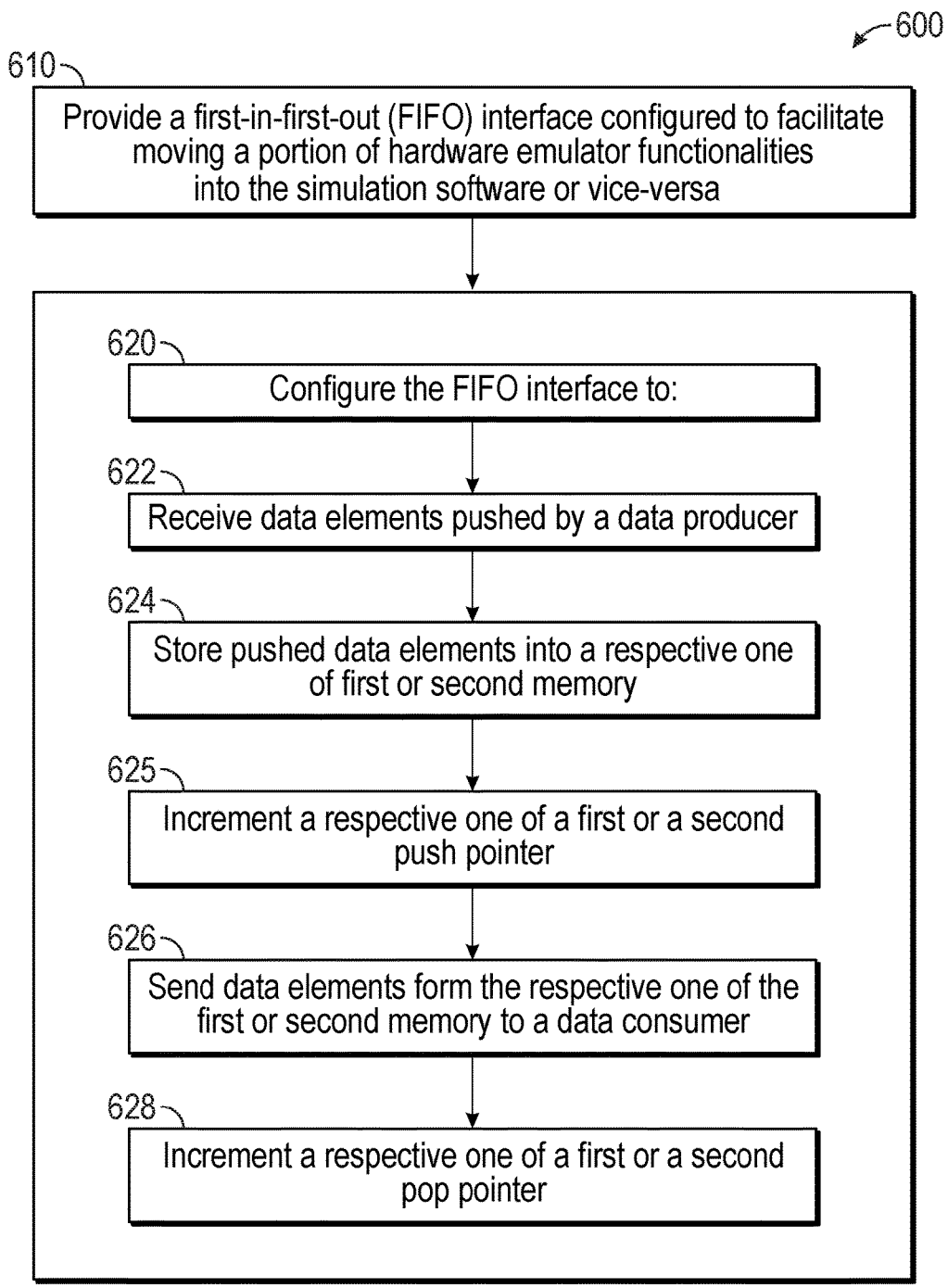
FIG. 6 is a flow diagram illustrating an example method for providing an interface for data transfer between simulation software and a hardware emulator associated with an integrated circuit design according to certain aspects of the disclosure.

FIG. 6 is a flow diagram illustrating an example method 600 for providing an interface for data transfer between simulation software and a hardware emulator associated with an integrated circuit design according to certain aspects of the disclosure. While FIG. 6 is described with reference to FIGS. 2, 4A, and 4C, it should be noted that the process steps of FIG. 6 may be performed by other systems. The process 600 begins by proceeding to step 610, when a FIFO interface (e.g., 200 of FIG. 2) is provided to facilitate communication between the hardware and software instances of the layers. The process 600 continues with step 620, when, the FIFO interface is instantiated. At step 622, elements pushed by a data producer (e.g., 450 of FIG. 4C) are received. Pushed elements (e.g., 200 of FIG. 2) are stored into a respective one of first memory (e.g., 260 of FIG. 2) or second memory (e.g., 270 of FIG. 2). At step 625, a respective one of a first push pointer (e.g., 242 of FIG. 2) or a second push pointer (e.g., 252 of FIG. 2) is incremented. At step 626, elements from the respective one of the first or second memory are sent to a data consumer (e.g., 430 of FIG. 4A). Finally, at step 628, a respective one of a first pop pointer (e.g., 244 of FIG. 2) or a second pop pointer (e.g., 254 of FIG. 2) is incremented.

Hardware Overview

Figure 7:
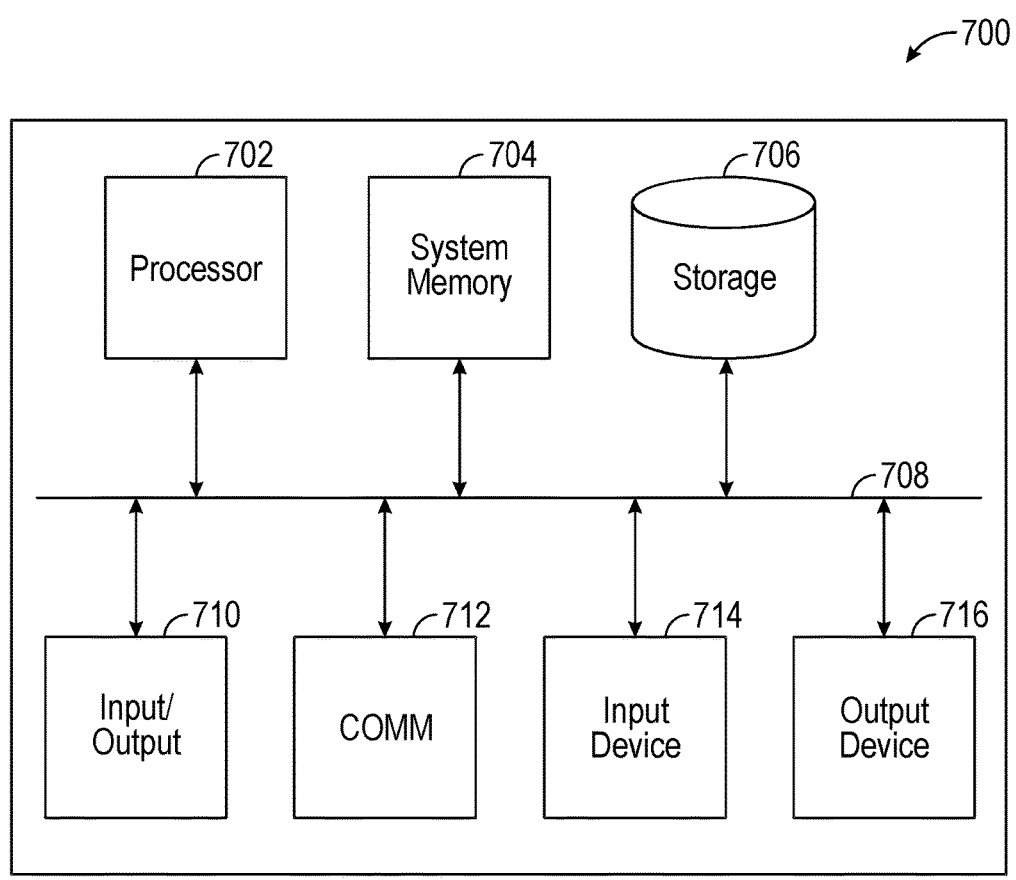
FIG. 7 is a block diagram illustrating an example computer system with which simulation software and hardware emulators of the subject technology can be implemented.

FIG. 7 is a block diagram illustrating an example computer system with which simulation software and hardware emulators of the subject technology can be implemented. In some aspects, the computer system 700 may represent the server 110, the computing device 120, the mobile computer 130, and the mobile device 140 of FIG. 1. In certain aspects, the computer system 700 may be implemented using hardware or a combination of software and hardware, either in a dedicated server, or integrated into another entity, or distributed across multiple entities.

Computer system 700 (e.g., server 110 or the computing device 120) includes a bus 708 or other communication mechanism for communicating information, and a processor 702 coupled with bus 708 for processing information. According to one aspect, the computer system 700 can be a cloud computing server of an infra-structure-as-a-service (IaaS) and can be able to support platform-as-a-service (PaaS) and software-as-a-service (SaaS).

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer readable medium for execution by, or to control the operation of, the computer system 700, and according to any method well known to those of skill in the art A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Example input/output modules 710 include data ports such as USB ports. In addition, input/output module 710 may be provided in communication with processor 702, so as to enable near area communication of computer system 700 with other devices. The input/output module 710 may provide, for example, for wired communication in some implementations, or for wireless communication in other implementations, and multiple interfaces may also be used. The input/output module 710 is configured to connect to a communications module 712. Example communications modules 712 (e.g., interfaces 125 and 135 of FIG. 1) may include networking interface cards, such as Ethernet cards and modems.

In certain aspects, the input/output module 710 is configured to connect to a plurality of devices, such as an input device 714 and/or an output device 716. Example input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device.

According to one aspect of the present disclosure, the server 110 and work station 120 can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. An interface for data transfer for use by simulation software and a hardware emulator associated with an integrated circuit design, the interface comprising:
   a data producer configured to push a plurality of elements,
   a first-in-first-out (FIFO) configured to receive the elements pushed by the data producer and to store pushed elements; and
   a data consumer configured to request the pushed elements from the FIFO,
   the FIFO comprising:
      a buffer array configured to store elements in software;
      memory configured to store elements in hardware;
      a first push pointer and a first pop pointer associated with the buffer array;
      a second push pointer and a second pop pointer associated with the memory; and
   a policy manager configured to enforce a policy for data transfer between the buffer array and the memory, wherein:
   the interface is configured to facilitate moving a portion of hardware emulator functionalities into the simulation software and vice-versa at runtime by utilizing the FIFO, and the policy manager conditions the copying to the buffer array of a content in the memory upon request by the buffer array for synchronization with the memory.

2. The interface of claim 1, wherein the FIFO comprises a hardware-description language (HDL) block and the data transfer is for use by the emulation hardware, wherein the data producer and the data consumer comprise hardware emulator blocks.

3. The interface of claim 2, wherein the FIFO further includes a synchronization scheme to keep the second push pointer and the second pop pointer associated with the memory in sync, and wherein the FIFO is configured to store the pushed elements in the memory and to increment the second push pointer.

4. The interface of claim 1, wherein the FIFO is configured to receive a request for the pushed elements and to retrieve the pushed elements from the memory for sending to the data consumer to increment the second pop pointer, and wherein a pushed element comprises variable bits of data and variable bits of control information.

5. The interface of claim 1, wherein the FIFO comprises a hybrid FIFO including an HDL FIFO and a software FIFO and the data transfer is from the hardware emulator to the simulation software, wherein the data producer comprises HDL and the data consumer comprises software.

6. The interface of claim 5, wherein the HDL FIFO is configured to store the pushed elements in the memory and to increment the second push pointer.

7. The interface of claim 5, wherein the HDL FIFO is configured to write, upon synchronization, content of the second push pointer to the first push pointer, to write a content of the memory to the buffer array, and to clear the memory.

8. The interface of claim 5, wherein the software FIFO is configured to receive a request for the pushed elements, to retrieve the pushed elements from the buffer array for sending to the data consumer, and to increment the first pop pointer.

9. The interface of claim 5, wherein the data producer comprises transport layer HDL and the data consumer comprises link layer software.

10. The interface of claim 1, wherein the FIFO comprises a hybrid FIFO including a software FIFO and an HDL FIFO and the data transfer is from the simulation software to the hardware emulator, wherein the data producer comprises software and the data consumer comprises HDL.

11. The interface of claim 10, wherein the software FIFO is configured to store the pushed elements in the buffer array and to increment the first push pointer.

12. The interface of claim 10, wherein the software FIFO is configured to write, upon synchronization, content of the first push pointer to the second push pointer, to write content of the buffer array to the memory, and to clear the buffer array.

13. The interface of claim 10, wherein the HDL FIFO is configured to receive a request for the pushed elements, to retrieve the pushed elements from the memory for sending to the data consumer, and to increment the second pop pointer.

14. The interface of claim 10, wherein the data producer comprises application layer software and the data consumer comprises transport layer HDL, or wherein the data producer comprises link layer software and the data consumer comprises physical layer HDL.

15. A computer-implemented method of interfacing simulation software and a hardware emulator associated with an integrated circuit design, the computer-implemented method comprising:
providing a first-in-first-out (FIFO) interface configured to facilitate moving a portion of hardware emulator functionalities into the simulation software; and
configuring the FIFO interface to:
receive elements pushed by a data producer,
store pushed elements into a respective one of first or second memory; increment a respective one of a first or a second push pointer;
send elements from the respective one of the first or second memory to a data consumer; and
increment a respective one of a first or a second pop pointer, wherein configuring the FIFO interface further comprises enforcing a data transfer policy between the first memory and the second memory upon a request for synchronization from either one of the first memory and the second memory.

16. The computer-implemented method of claim 15, wherein providing the FIFO interface comprises providing a hybrid FIFO interface including a software FIFO and an HDL FIFO, wherein the method further comprises configuring the HDL FIFO to:
store pushed elements in the second memory;
increment the second push pointer;
upon synchronization, write content of the second push pointer to the first push pointer;
write content of the second memory to the first memory; and
clear the second memory.

17. The computer-implemented method of claim 16, wherein the software FIFO is configured to retrieve elements from the first memory to the data consumer and to increment the first pop pointer, and further comprising accessing content of the FIFO interface at a desired time from software and manipulating the content for enabling advanced verification scenarios.

18. The computer-implemented method of claim 15, wherein providing the FIFO interface comprises providing a hybrid FIFO interface including a software FIFO and an HDL FIFO, wherein the method further comprises configuring the software FIFO to:
store pushed elements in the first memory;
increment the first push pointer;
upon synchronization, write content of the first push pointer to the second push pointer;
write content of the first memory to the second memory; and
clear the first memory.

19. The computer-implemented method of claim 18, wherein the HDL FIFO is configured to retrieve elements from the second memory for sending to the data consumer and to increment the second pop pointer.

20. A system for executing simulation software and a hardware emulator associated with an integrated circuit design, the system comprising:
a computing device;
a plurality of servers in communication with the computing device;
an interface configured to facilitate moving a portion of the hardware emulator functionalities into the simulation software by utilizing a first-in-first-out (FIFO) interface; and a policy manager configured to enforce a policy for data transfer between a first memory and a second memory, wherein:

one or more of the computing device and the plurality of servers are configured to execute one or more design simulation software or hardware emulation runs associated with an integrated circuit design, the FIFO interface is configured to:
- receive elements pushed by a data producer;
- store pushed elements into a respective one of first or second memory;
- increment a respective one of a first or a second push pointer;
- send elements from the respective one of the first or second memory to a data consumer; and
- increment a respective one of a first or a second pop pointer, and the policy manager is configured to condition to copy at least a portion of the content of the first memory to the second memory upon a request for synchronization from the second memory.

* * * * *